US011294650B2

(12) United States Patent
Smith

(10) Patent No.: US 11,294,650 B2
(45) Date of Patent: Apr. 5, 2022

(54) STRING LOGGING IN AN EMBEDDED SYSTEM

(71) Applicant: Nordic Semiconductor ASA, Trondheim (NO)

(72) Inventor: Christopher Philip Smith, Bristol (GB)

(73) Assignee: Nordic Semiconductor ASA, Trondheim (NO)

( * ) Notice: Subject to any disclaimer, the term of this patent is extended or adjusted under 35 U.S.C. 154(b) by 598 days.

(21) Appl. No.: 15/677,939

(22) Filed: Aug. 15, 2017

(65) Prior Publication Data

US 2018/0052669 A1 Feb. 22, 2018

(30) Foreign Application Priority Data

Aug. 16, 2016 (GB) ...................................... 1614035

(51) Int. Cl.
*G06F 8/41* (2018.01)
*G06F 9/448* (2018.01)
*G06F 9/445* (2018.01)

(52) U.S. Cl.
CPC ............ *G06F 8/4441* (2013.01); *G06F 8/447* (2013.01); *G06F 8/4434* (2013.01); *G06F 9/449* (2018.02); *G06F 9/44521* (2013.01)

(58) Field of Classification Search
CPC ...... G06F 8/4441; G06F 8/4434; G06F 8/447; G06F 9/449; G06F 9/44521
USPC .......................................................... 717/153
See application file for complete search history.

(56) References Cited

U.S. PATENT DOCUMENTS

| 6,161,200 | A | 12/2000 | Rees et al. | |
|---|---|---|---|---|
| 2002/0087956 | A1* | 7/2002 | Darlet | G06F 9/44521 717/159 |
| 2005/0097544 | A1* | 5/2005 | Kim | G06F 8/65 717/173 |
| 2007/0168049 | A1* | 7/2007 | Rao | G06F 11/3031 700/11 |
| 2012/0289299 | A1* | 11/2012 | Stevens | G07F 17/3293 463/13 |
| 2015/0317233 | A1 | 11/2015 | Tushar et al. | |
| 2016/0132322 | A1* | 5/2016 | Jones | G06F 9/445 717/168 |

* cited by examiner

*Primary Examiner* — Jae U Jeon
*Assistant Examiner* — Bradford F Wheaton
(74) *Attorney, Agent, or Firm* — Klarquist Sparkman, LLP

(57) ABSTRACT

Methods for logging strings during execution of a program running on an embedded system without storing the strings in the memory of the embedded system include, during the build process, receiving source code for a program that comprises one or more log statements that identifies a string to be logged; generating object code based on the source code that comprises a special log section that includes the identified strings, and, for each log statement one or more instructions that cause a reference to the corresponding string to be stored in memory of the embedded system; generating execution code based on the object code wherein the special log section is marked as non-loadable and each reference is a location of the corresponding string in the special log section; and, loading the generated executable code into the memory of the embedded system such that the identified strings are not loaded into the memory of the embedded system.

19 Claims, 10 Drawing Sheets

STRINGS

LOG BUFFER

COMPLETE LOG

EXECUTABLE CODE

LOG BUFFER

COMPLETE LOG

STRING LOGGING IN AN EMBEDDED SYSTEM

BACKGROUND

When a programmer or developer wants to monitor the progress of a program running on an embedded system the programmer or developer may include, in the program, instructions that cause a human-readable message or string to be output at various points in the program. For example, the programmer or developer may include in the program an instruction such as "print 'I am at place A'".

As is known to those of skill in the art, an embedded system, in contrast to a general purpose computing-based system, is a computing-based system that is designed for a specific purpose, and is typically constrained in its size, power requirements and/or features in comparison to general purpose computing-based systems. Accordingly, to monitor the progress of a program running on an embedded system the embedded system is typically connected or coupled to a general purpose computing-based device (which may be referred to as the host computing-based device) that is used to store and/or display the human-readable messages or strings.

However, such a configuration typically requires the processor of the embedded system to halt processing for a prohibitive amount of time each time it transfers a human-readable message or string to the host computing-based device.

The embodiments described below are provided by way of example only and are not limiting of implementations which solve any or all of the disadvantages of known methods and systems for monitoring the progress of a program running on an embedded system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are methods and systems for logging human-readable messages or strings during execution of a program running on an embedded system without storing the human-readable messages or strings in the memory of the embedded system. The methods include, during the build process, receiving source code for a program that comprises one or more log statements that identifies a particular human-readable message or string to be logged; generating object code based on the source code that comprises a special log section that includes the identified human-readable messages or strings, and, for each log statement one or more instructions that cause a reference to the corresponding human-readable message or string to be stored in memory of the embedded system; generating executable code based on the object code wherein the special log section is marked as non-loadable and each reference is a location of the corresponding human-readable message or string in the special log section; and, loading the generated executable code into the memory of the embedded system such that the human-readable messages or strings are not loaded into the memory of the embedded system.

A first aspect provides a computer-implemented method to generate executable code for a program to be run on an embedded system which causes the embedded system to log one or more strings during execution of the executable code, the method comprising: receiving source code for a program, the source code identifying one or more strings to be logged during execution of the program; causing a compiler to generate object code based on the source code such that the object code comprises: a separate log section that includes the one or more identified strings; and one or more instructions to cause the embedded system to write a reference to one of the one or more strings to memory of the embedded system, the reference represented by a symbol associated with the string; causing a linker to generate executable code based on the object code by causing the linker to mark the separate log section as a non-loadable section, and to replace each symbol associated with a string in the one or more instructions with information indicating the location of the string in the separate log section so as to form one or more executable instructions; and loading the executable code comprising the one or more executable instructions into the memory of the embedded system such that the one or more identified strings are not stored in the memory of the embedded system.

A second aspect provides a system to generate executable code for a program to be run on an embedded system which causes the embedded system to log one or more strings during execution of the executable code, the system comprising: a compiler configured to: receive source code for a program, the source code identifying one or more strings to be logged during execution of the program; and generate object code based on the source code such that the object code comprises: a separate log section that includes the one or more identified strings; and one or more instructions to cause the embedded system to write a reference to one of the one or more strings to memory of the embedded system, the reference represented by a symbol associated with the string; a linker configured to generate executable code based on the object code by marking the separate log section as a non-loadable section, and replacing each symbol associated with a string in the one or more instructions with information indicating a location of the string in the separate log section so as to form one or more executable instructions; and a loader configured to load the executable code comprising the one or more executable instructions into the memory of the embedded system such that the one or more identified strings are not stored in the memory of the embedded system.

A third aspect provides an embedded system comprising a processor configured to log one or more strings during execution of a program, the embedded system obtained by performing the method of the first aspect to load executable code representing the program into a memory of the embedded system without loading the one or more strings into the memory of the embedded system.

A fourth aspect provides a host computing-based device configured to generate a complete log of strings representing flow of a program executed by a processor of an embedded system, the host computing-based device comprising: a processor; and memory comprising computer executable instructions that when executed by the processor cause the processor to: receive a file comprising a log section of executable code representing the program, the log section comprising one or more strings; obtain one or more references stored in memory of the embedded system, each reference identifying a location of a string of the one or more strings in the log section of the executable code, the references being stored in the memory of the embedded system during execution of the program; and generating a complete log that includes one or more strings of the received file identified by the references in the log buffer.

A fifth aspect provides a computer-implemented method of generating a complete log of strings representing flow of a program executed by a processor of an embedded system, the method comprising: receiving a file comprising a log section of executable code representing the program, the log section comprising one or more strings; obtaining one or more references stored in memory of the embedded system, each reference identifying a location of a string of the one or more strings in the log section of the executable code, the references being stored in the memory of the embedded system during execution of the program; and generating a complete log that includes one or more strings of the received file identified by the references in the log buffer.

A sixth aspect provides computer readable code configured to perform the steps of the method of the first aspect when the computer readable code is run on a computer.

A seventh aspect provides a computer readable storage medium having encoded thereon the computer readable code of the sixth aspect.

The embedded system may be embodied in hardware on an integrated circuit. There may be provided a method of manufacturing, at an integrated circuit manufacturing system, an embedded system. There may be provided an integrated circuit definition dataset that, when processed in an integrated circuit manufacturing system, configures the system to manufacture an embedded system. There may be provided a non-transitory computer readable storage medium having stored thereon a computer readable description of an integrated circuit that, when processed, causes a layout processing system to generate a circuit layout description used in an integrated circuit manufacturing system to manufacture an embedded system.

There may be provided an integrated circuit manufacturing system comprising: a non-transitory computer readable storage medium having stored thereon a computer readable integrated circuit description that describes the embedded system; a layout processing system configured to process the integrated circuit description so as to generate a circuit layout description of an integrated circuit embodying the embedded system; and an integrated circuit generation system configured to manufacture the embedded system according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
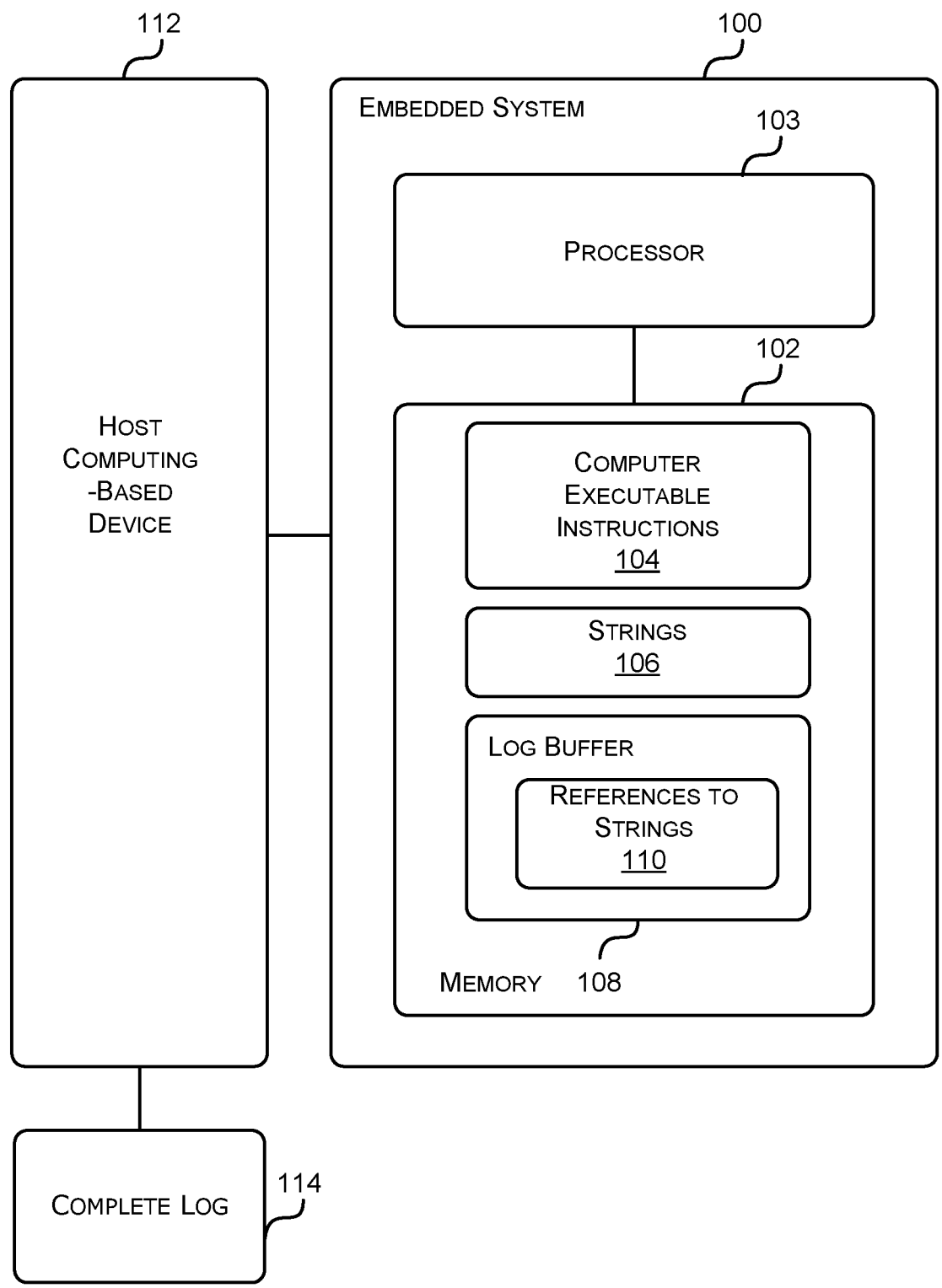
FIG. 1 is a block diagram of an example embedded system configured to log human-readable messages or strings during execution of a program wherein the human-readable messages or strings are stored memory of the embedded system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, outputting human-readable messages or strings to a host computing-based system while a program is running on an embedded system typically requires the processor of the embedded system to halt processing for a prohibitive amount of time each time the processor transfers a human-readable message or string to the host computing-based device. To address this problem embedded systems may be configured to log the human-readable messages or strings in a buffer in the memory of the embedded system while the program is running. The human-readable messages or strings stored in the buffer can then be later transferred to the host computing-based device at one time (i.e. all together).

In some embedded systems, instead of storing the actual human-readable messages or strings in the log buffer, one instance of each human-readable message or string is stored in memory (e.g. in a string table) and only references to the stored messages or strings are stored in the log buffer. The references may be, for example, an index or offset into the string table.

For example, reference is made to FIG. 1 which illustrates an example embedded system 100 for executing computer executable instructions representing a program that cause the processor of the embedded system to log human-readable messages or strings. As described above, an embedded system, in contrast to a general purpose computing-based system, is a computing-based system that is designed for a specific purpose, and is typically constrained in its size, power requirements and/or features in comparison to general purpose computing-based systems. A non-limiting example of an embedded system is a radio processing unit (RPU) which is specifically designed to process radio signals.

The embedded system 100 of FIG. 1 comprises memory 102 and a processor 103. However, it will be evident to a person of skill in the art that the embedded system 100 may comprise other components that are not shown.

The memory 102 is configured to store: computer executable instructions 104 representing a program; one or more human-readable messages or strings 106; and a log buffer 108 for storing references 110 to the stored human-readable messages or strings 106. The references 110 may be any information that identifies a particular stored human-readable message or string 106. For example, where the human-readable messages or strings are stored in a list or table the references 110 may be an index into the list or table.

The processor 103 is configured to execute the stored computer executable instructions 104. The computer executable instructions 104 include one or more instructions that, when executed by the processor 103, cause the processor 103 to write a reference 110 to a stored human-readable message or string 106 in the log buffer 108. As described above, the reference may be any information that identifies a particular stored human-readable message or string 106.

Figure 2:
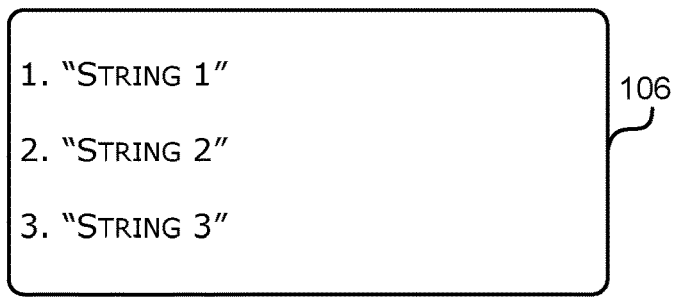
FIG. 2 is a schematic diagram illustrating example human-readable messages or strings logged by the embedded system of FIG. 1.
Figure 2:
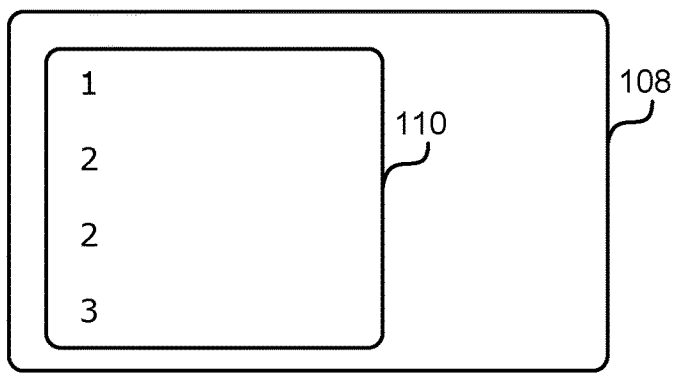
Figure 2:

For example, as shown in FIG. 2, three human-readable messages or strings 106—"String 1"; "String 2"; and "String 3"—may be stored in the memory 102 of the embedded system 100 in an indexed string table. The first string—"String 1"—is indexed by index 1, the second string—"String 2"—is indexed by index 2; and the third string—"String 3" is indexed by index 3.

Where computer executable instructions 104 include instructions that when executed by the processor 103 cause the processor 103 to store the index for a particular human readable message or string in the log buffer 108, as shown in FIG. 2 the log buffer 108 may contain the indexes—1, 2, 2, 3—which refer to the first human-readable message or string, the second human-readable message or string, the second human readable message or string and the third human-readable message or string respectively.

Recording references 110 to the stored human-readable messages or strings 106 allows the progress and/or operation of the program to be recorded via the human-readable messages or strings without having to write each human-readable message or string 106 into the buffer 108.

Once the program has been run (or after another event) the references 110 in the log buffer 108, and the stored human-readable messages or strings 106 are transferred to a host computing-based device 112, such as a general purpose computing-based device 900 described below with reference to FIG. 9. The host computing-based device 112 can then generate a complete log 114 of human-readable messages or strings from the references 110 in the log buffer 108 and the stored human-readable messages or strings 106 by matching the references 110 to the stored human-readable messages or strings 106.

For example, as shown in FIG. 2, the host computing-based device 112 may generate a complete log 114 that comprises the strings—"String 1", "String 2", "String 2", and "String 3" based on the references 110 in the log buffer 108 and the stored human-readable messages or strings 106.

While such an embedded system 100 allows human-readable messages or strings to be logged in a buffer of the embedded system during execution of a program, most embedded systems have a limited amount of memory and the human-readable messages or strings may consume a significant portion of the memory of the embedded system. For example, some computer programs may have 1,000 or more human-readable messages or strings that are logged during execution. This may mean that logging has to be disabled or restricted so that the entire program can be stored in the memory of the embedded system.

Accordingly, described herein are methods and systems for logging human-readable messages or strings during execution of a program running on an embedded system without storing the human-readable messages or strings in the memory of the embedded system.

The methods include, during the build process, receiving source code for a program that comprises one or more log statements that include a human-readable message or string to be logged; generating object code based on the source code that comprises a special log section that includes the human-readable messages or strings, and, for each log statement one or more instructions that cause a reference to the corresponding human-readable message or string to be stored in memory of the embedded system; and generating executable code based on the object code wherein the special log section is marked as non-loadable and each reference is a location of the corresponding human-readable message or string in the special log section.

The executable code can then be loaded into the memory of the embedded system such that human-readable messages or strings are not loaded into the memory of the embedded system. When the stored computer executable instructions are subsequently executed by the processor of the embedded system they cause the processor to, for each log statement in the original source code, store in the log buffer a reference to the log section of the executable code which identifies a particular human-readable message or string. The reference information logged in the log buffer can then be used, by, for example, a host computing-based device, to retrieve the actual human-readable messages or strings from the executable code.

In this way the source code for a program can include, and refer to, human-readable messages or strings which will be logged during execution of the program by an embedded system without requiring the human-readable messages or strings to be stored in the memory of the embedded system.

Figure 3:
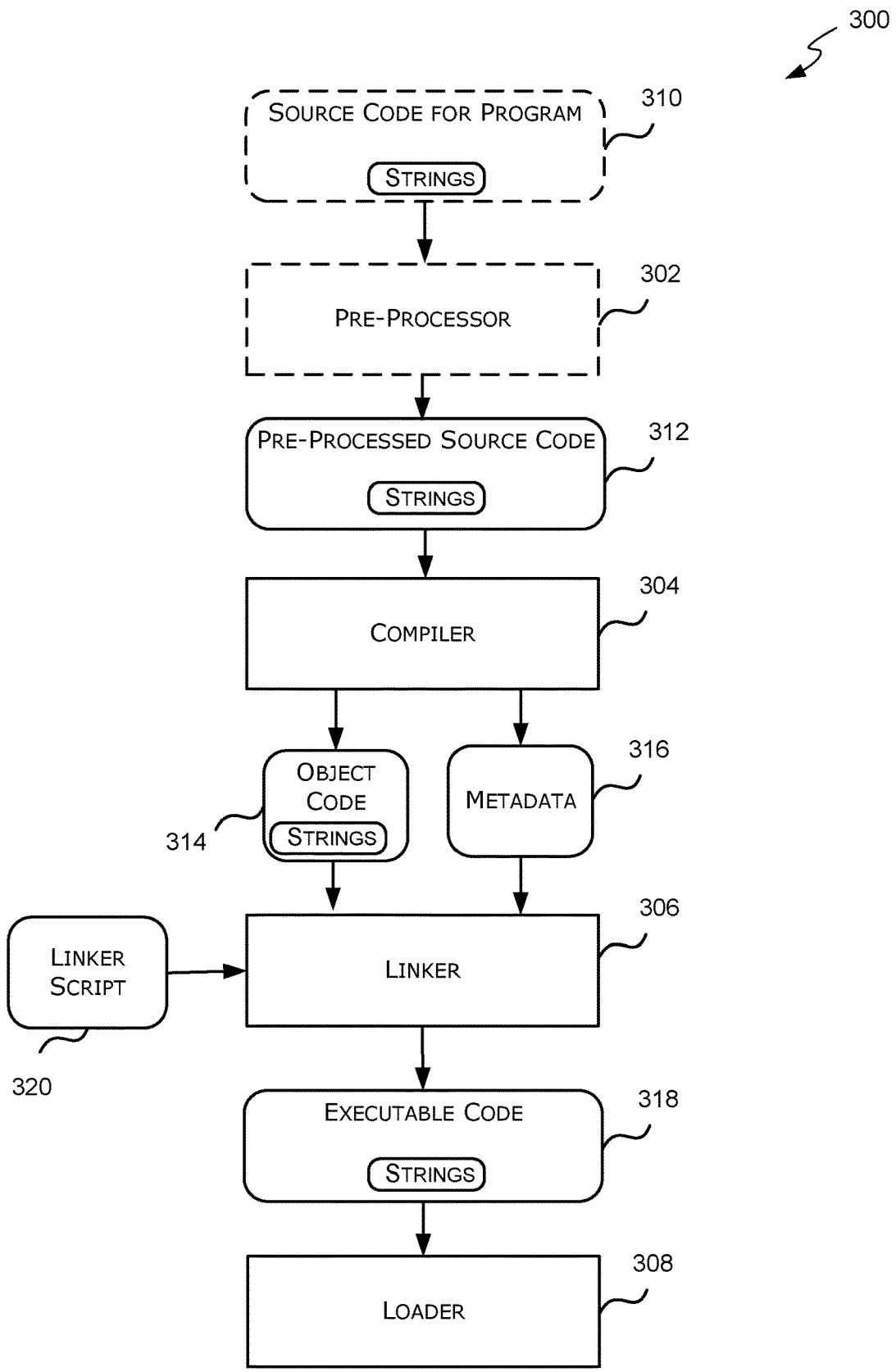
FIG. 3 is a block diagram illustrating an example system for generating executable code for a program that causes an embedded system to log human-readable messages or strings wherein the human-readable messages or strings are not stored in memory of the embedded system.

Reference is now made to FIG. 3 which illustrates an example system 300 for generating executable code for an embedded system that will cause the embedded system to log human-readable messages or strings during execution of the executable code without storing the human-readable messages or strings in the memory of the embedded system. The system 300 comprises a pre-processor 302, a compiler 304, a linker 306, and a loader 308. The system 300 may be implemented using one or more general purpose computing-based devices, such as the computing-based device 900 described below with reference to FIG. 9.

The pre-processor 302 is a software program or tool that is can perform text operations, including, but not limited to pattern matching and replacement which is configured to identify logging statements in the source code 310 for a program which identify a human-readable message or string to be logged, and replace each identified logging statement in the source code 310 with a set of instructions that cause the identified human-readable message or string to be stored in a particular section of the resultant object code, and cause a reference to the corresponding human-readable message or string to be logged in the memory of the embedded system (e.g. in a log buffer of the embedded system). As is known to those of a skill in the art, source code is a description of a program in a high-level programming language, such as, but not limited to C, which is readable by humans, but not a processor.

The source code 310 received by the pre-processor 302 comprises one or more "logging statements" which is a statement or instruction in the source code 310 with a predefined format that indicates that a particular human-readable message or string is to be logged when that point in the program is reached.

Figure 4:
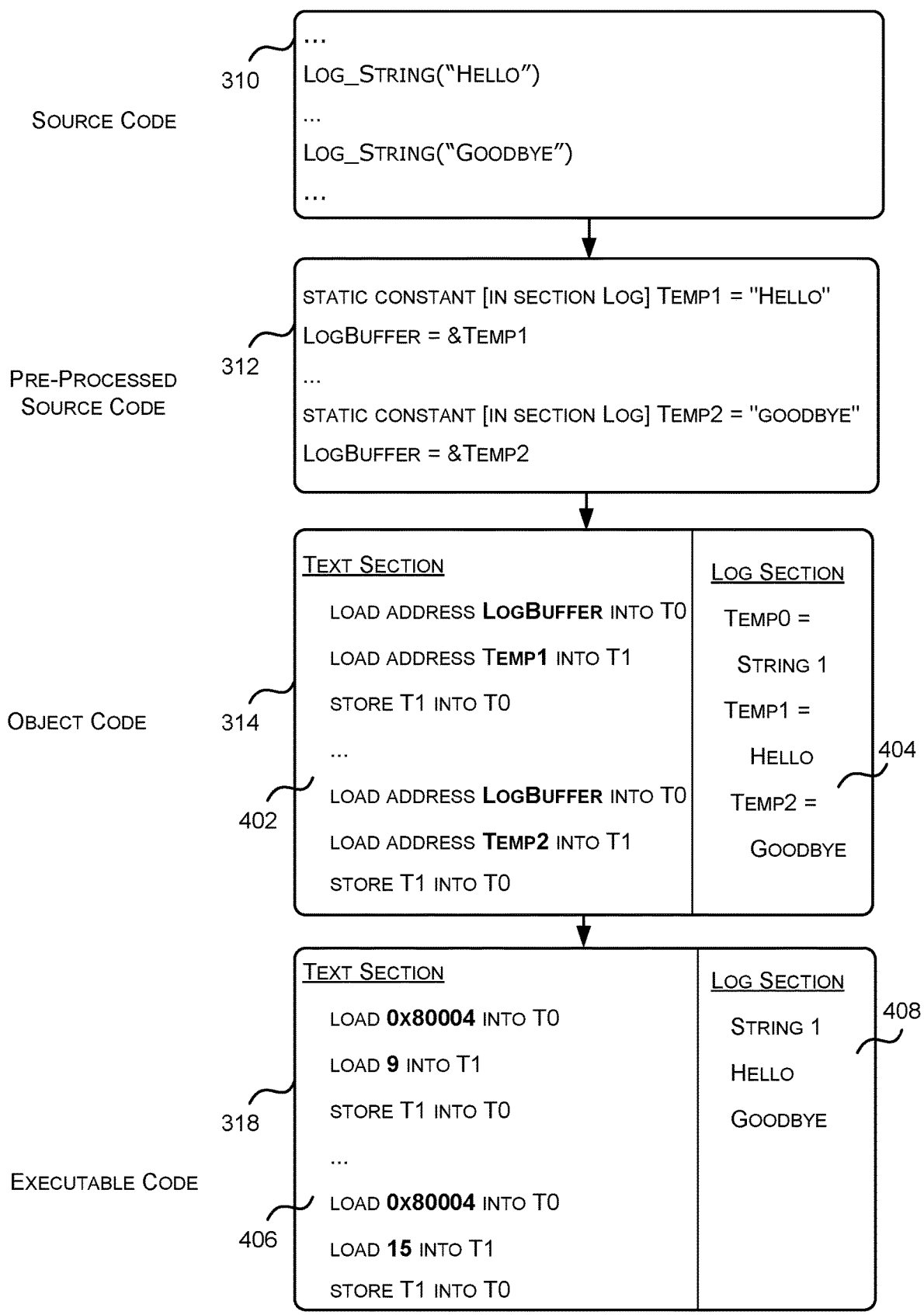
FIG. 4 is a schematic diagram illustrating example executable code generated by the system of FIG. 3.

Example syntax for a logging statement may be Log_String ("STRING EXAMPLE") as shown in FIG. 4 which indicates that the string "STRING EXAMPLE" is to be logged. It will be evident to a person of skill in the art that this is just an example and the syntax of a logging statement may vary so long as the pre-processor 302 understands from the statement (i) that a human-readable message or string is to be logged; and (ii) the particular string that is to be logged.

When the pre-processor 302 identifies a logging statement in the source code 310 the pre-processor 302 replaces the logging statement in the source code 310 with one or more source code instructions which (i) cause the identified human-readable message or string to be stored in a particular section in the resulting object code; and (ii) cause a reference to the identified human-readable message or string to be written to memory of the embedded system (e.g. written to a log buffer of the embedded system). The reference may be any information that allows the corresponding human-readable message or string to be uniquely identified. In some cases the reference is an address of the human-readable message or string.

For example, as shown in FIG. 4, the pre-processor 302 may replace the logging statement "Log_String ("Hello")" with two instructions. The first instruction, "static constant [in section Log] Temp1="Hello"" creates a variable Temp1 which is to be stored in a static constant array in the Log section of the object code. The second instruction, "LogBuffer=&Temp1", causes the address of the Temp1 variable to be written to the LogBuffer.

After the logging statements in the source code 310 have been replaced by appropriate instructions the modified source code is referred to herein as the pre-processed source code 312.

Using logging statements in the source code 310 to identify human-readable messages or strings to be logged allows programmers or developers of computer programs to use a simple known format to identify human-readable messages or strings to be logged without worrying about the complexities of how the logging is actually done. The complexities of how the logging is done are handled by the downstream components such as the pre-processor 302.

However, other example systems may not include a pre-processor 302 and the programmers and/or developers may include in the source code 310 instructions that (i) cause the identified human-readable message or string to be stored in a particular section in the resulting object code; and (ii) cause a reference to the corresponding human-readable message or string to be written to memory of the embedded system (e.g. written to a log buffer of the embedded system).

The compiler 304 is a software program or tool that is configured to convert source code into object code. As is known to those of a skill in the art object code is a description of a program in a lower level language, such as assembly language or machine language, which is understood by a processor.

The compiler 304 also typically generates metadata that identifies the symbols in the object code and their type (e.g. executable instructions, initialised data, uninitialised data, read-only data etc.) and size. In some cases the compiler 304 generates a single file, such as an executable and linkable format (ELF) file, that contains both the object code and the metadata.

The compiler 304 of FIG. 3 receives the pre-processed source code 312 generated by the pre-processor 302 (or the original source code 310 in some cases) and generates corresponding object code 314 and metadata 316.

In particular, the compiler 304 converts the higher level instructions in the pre-processed source code 312 into, for example, machine instructions. For example, as shown in FIG. 4, the compiler 304 may convert the source code instruction "LogBuffer=&Temp1" to a set of machine instructions such as:

```
load address LogBuffer into T0
load address Temp1 into T1
store T1 into T0
``` where LogBuffer is the Log Buffer of the embedded system, and T0 and T1 are registers of the embedded system. It will be evident to a person of the art that the first instruction loads the address of the LogBuffer into register T0, the second instruction loads the address of Temp1 (where the string "Hello" is being stored) into register T1, the third instruction stores the contents of register T1 (the address of Temp1) at the contents of register T0 (the address of the LogBuffer). Therefore these instructions cause the address associated with the string "Hello" to be stored in the Log Buffer.

It will be evident to a person of skill in the art that the example instructions described above and shown in FIG. 4 are examples only and the syntax may vary based on the programming language understood by the processor.

Most object file formats are structured as separate sections of data containing a certain type of data. For example, text sections (which may also be referred to as code sections) typically comprise executable instructions; data sections typically comprise initialized variables, and BSS sections typically comprise uninitialized data (both variables and constants). In the examples described herein the compiler 304 is configured to generate a special log section in the object code 314 that comprises the identified human-readable messages or strings. For example, as shown in FIG. 4 the object code 314 comprises a text section 402 that includes the instructions, and a log section 404 that includes the human-readable messages or strings.

While the object code 314 is in a format that a processor can understand the object code is not typically in a format that can be executed by a processor of an embedded system. This is because the object code does not comprise memory addresses for the symbols in the program. As is known to those of skill in the art a symbol is a name or string used to refer to a variable, subroutine etc. and typically has a size or space requirement associated therewith. For example, in the object code 314 of FIG. 4 LogBuffer, Temp1 and Temp2 are examples of symbols.

For a program running on a general computing-based device with an operating system or memory-management unit, symbols are typically dynamically allocated memory addresses at run time. However, in embedded systems without an operating system or an MMU to dynamically allocate memory addresses, the symbols are typically hard coded (i.e. statically linked) with a memory address before the executable code is loaded into memory. Therefore the object code 314 for a program to be run on an embedded system can be thought of as having holes where the memory addresses associated with the symbols are inserted.

Accordingly, the object code 314 (and associated metadata 316) is provided to a linker 306 for generating executable code 318 representing the program. The term "executable code" is used herein to mean a file in a format that a processor can directly execute and may also be referred to as an executable file or an executable. Executable code comprises computer executable instructions in a predetermined format understood by a processor that when executed by a processor cause the processor to perform specific tasks.

As is known to those of skill in the art generating executable code for an embedded system from object code comprises filling in the holes where the memory addresses associated with the symbols are inserted. In particular the linker 306 associates each symbol in the object code 314 with an address, and then generates executable code from the object code based on the addresses associated with the symbols. For example, as shown in FIG. 4 the linker 306 may allocate memory address 0x80004 to the LogBuffer and generate the executable code from the object code by replacing LogBuffer with address 0x80004.

Generally a linker 306 uses a linker script to determine (i) how to map sections in the object code to sections in the executable code; and (ii) where to place the output sections in memory. For example, the following is an example of a basic linker script which causes the linker 306 to (i) map the text sections (*.(text)) of the object code in a single text section in the executable code which is placed at address 0x10000 of the memory of the embedded system; and to map the data sections (*.(data)) of the object code in a single data section in the executable code which is placed at address 0x8000000 of the memory of the embedded system.

```
SECTIONS
{
    . = 0x10000;
    .text : { *(.text) }
    . = 0x8000000;
    .data : {*(.data) }
}
```

In the embodiments described herein the linker 306 uses a linker script 320 that causes the linker 306 to map the special log section of the object code to a corresponding log section of the executable code and to mark the log section as a non-loadable section. A non-loadable section of object code is placed in the executable code, but when the executable code is loaded into memory the non-loadable section is not loaded into memory. This allows a program to refer to the human-readable messages or strings without actually loading the human-readable messages or strings into memory.

The following is an example of a linker script 320 which causes the linker 306 to mark the special log section 404 of the object code 314 as a non-loadable section and allocate addresses for the contents of that section starting from address 0. This has the effect of causing the addresses used by the linker 306 for the symbols within that section to also be an indication of the symbol's position within that section.

```
SECTIONS
{
    . = 0x10000;
    .text : { *(.text) }
    . = 0x8000000;
    .data : { *(.data) }
    . = 0x0000000;
    .log 0 (NOLOAD) : { *(.log) }
}
```

For each symbol in the non-loadable section the linker 306 allocates an address (e.g. which starts from address 0) or another reference (e.g. an offset from the beginning of the log section) indicating the location of the corresponding string in the log section. The symbols are then replaced by the allocated address or reference (e.g. offset) in the executable code. This causes the address or other reference (e.g. offset) to be logged or stored in the log buffer of the embedded system when the executable code is run by the processor of the embedded system. For example, as shown in FIG. 4, symbols Temp1 and Temp2 have been allocated offsets 9 and 15 respectively and then they have been replaced by their offsets in the executable code 318. This causes the offsets to be stored in the log buffer of the embedded system when the executable code is run by the processor of the embedded system.

Once the executable code 318 is generated it is provided to the loader 308. The loader 308 is a software program or tool that is configured to load executable code into memory. In this case the loader 308 receives the executable code 318 generated by the linker 306 and loads the executable code 318 into the memory of the embedded system. However, although the executable code 318 comprises the human-readable messages or strings to be logged, the human-readable messages or strings are not actually loaded into the memory of the embedded system since the section they are stored in (e.g. log section 408) is marked as non-loadable. For example, with reference to the example executable code 318 of FIG. 4, the loader 308 may load the text section 406 of the executable code 318 into the memory of the embedded system, but not the log section 408 of the executable code.

In some cases the executable code 318 (e.g. an executable linkable format (ELF) file)) may comprise metadata that indicates, amongst other things, where in the memory the executable code 318 should be loaded. In other cases the loader 308 may be run on the embedded system (e.g. embedded system 500 described below) itself and the boot image of the embedded system may include metadata that indicates where in the memory the executable code 318 should be loaded.

Figure 5:
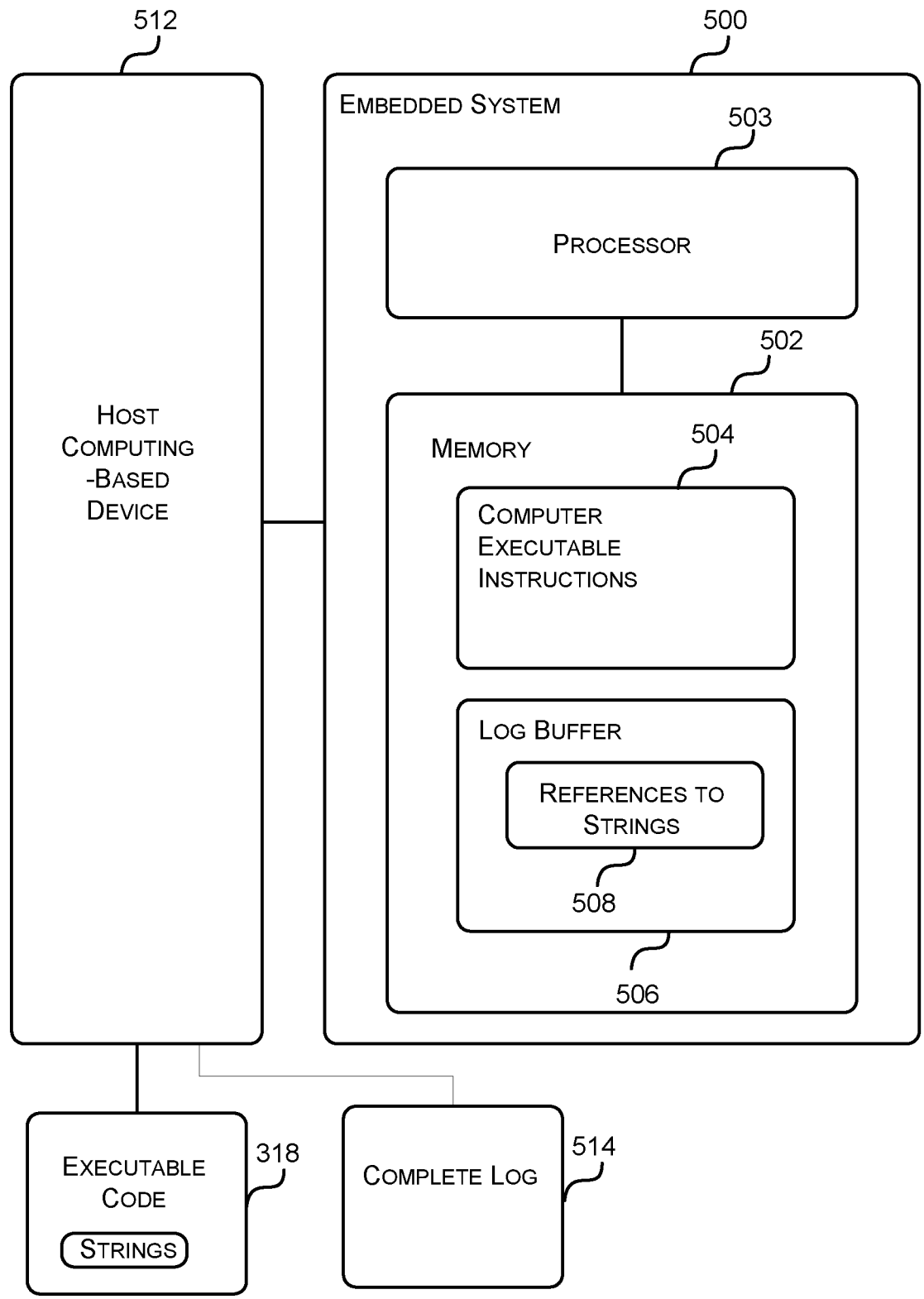
FIG. 5 is a block diagram of an example embedded system configured to log human-readable messages or strings during execution of a program without storing the human-readable messages or strings in memory of the embedded system.

Reference is made to FIG. 5 which illustrates an example embedded system 500 for executing executable code generated by the system of FIG. 3 that logs human-readable messages or strings for debugging or monitoring purposes without having to store the human-readable messages or strings in the memory of the embedded system. As described above, an embedded system, in contrast to a general purpose computing-based system, is a computing-based system that is designed for a specific purpose, and is typically constrained in its size, power requirements and/or features in comparison to general purpose computing-based systems. A non-limiting example of an embedded system is a radio processing unit (RPU) which is specifically designed to process radio signals.

The embedded system 500 of FIG. 5 comprises memory 502 and a processor 503. The memory 502 may be any suitable type of memory for storing computer executable instructions such as, but not limited to, random access memory (RAM), read-only memory (ROM) or a combination thereof. The processor 503 may be a microprocessor, controller or any other suitable type of processor for processing computer executable instructions to control the operation of the embedded system 500.

The memory 502 is configured to store computer executable instructions 504 representing or forming a computer program; and a log buffer 506 for storing references 508 to human-readable messages or strings stored in the executable code 318. The references 508 may be any information that allows the corresponding human-readable message or string to be uniquely identified in the executable code 318. For example, as described above, each reference 508 may be an offset into a particular section (e.g. log section 406) of the executable code 318 that comprises the corresponding human-readable message or string.

The processor 503 is configured to execute the stored computer executable instructions 504. The computer executable instructions 504 include one or more instructions that, when executed by the processor 503, cause the processor 503 to write a reference 508 in the log buffer 506 indicating the location of a particular human-readable message or string in the computer executable code 318.

Figure 6:
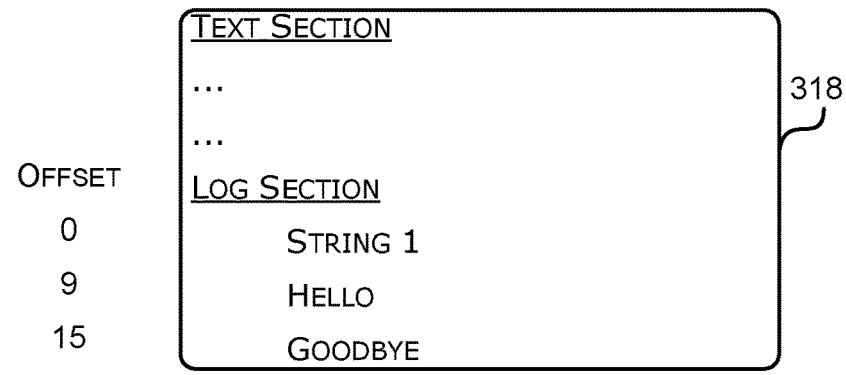
FIG. 6 is a schematic diagram illustrating example human-readable messages or strings logged by the embedded system of FIG. 5.
Figure 6:
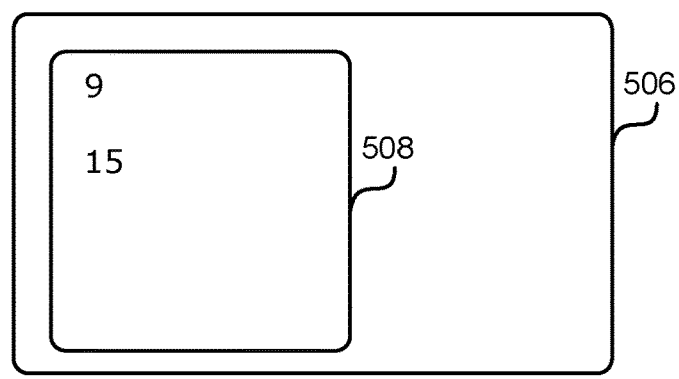
Figure 6:
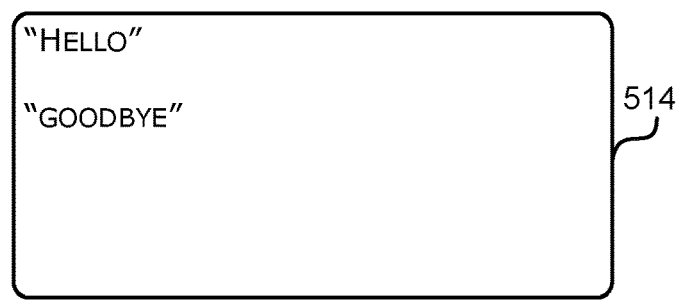

For example, as shown in FIG. 6, three human-readable messages or strings may be stored in a log section of the executable code 318—"String 1"; "Hello"; and "Goodbye". Where each character of a human-readable message or string is one byte in size and each string ends with a null character, the first string—"String 1"—is at offset 0 in the log section, the second string—"Hello"—is at offset 9 in the log section (since the first string takes up nine bytes—eight characters plus the null character); and the third string—"Goodbye" is at offset 15 in the log section (since the second string takes up six bytes—five characters plus the null character). If the computer executable instructions include instructions that cause the offset for the second and third strings to be written to the log buffer 506 then the log buffer 506 may include the following offsets—9, 15.

Recording the location of a human-readable message or string in executable code 318 allows the progress and/or operation of the program to be recorded via human-readable messages or strings without having to store the human-readable messages or strings in the memory of the embedded system.

Referring back to FIG. 5, once the program has been run (or after another event) the references 508 (e.g. addresses or offsets into the log section of the executable code 318) stored in the log buffer 506 can be transferred to a host computing-based device 512, such as a general purpose computing-based device 900 described below with reference to FIG. 9. The host computing-based device 512 can then generate a complete log 514 of human-readable messages from the references 508 in the log buffer 506 and the executable code 318.

For example, as shown in FIG. 6, the host computing-based device 512 may generate a complete log 514 that comprises the human-readable messages or strings: "Hello", and "Goodbye" by identifying human-readable messages or strings in the executable code 318 from the references 508 in the log buffer 506. An example method for generating a complete log from the references 508 in the log buffer 506 is described below with reference to FIG. 8.

It will be evident to a person of skill in the art that the embedded system 500 of FIG. 5 may also comprise other components not shown.

Figure 7:
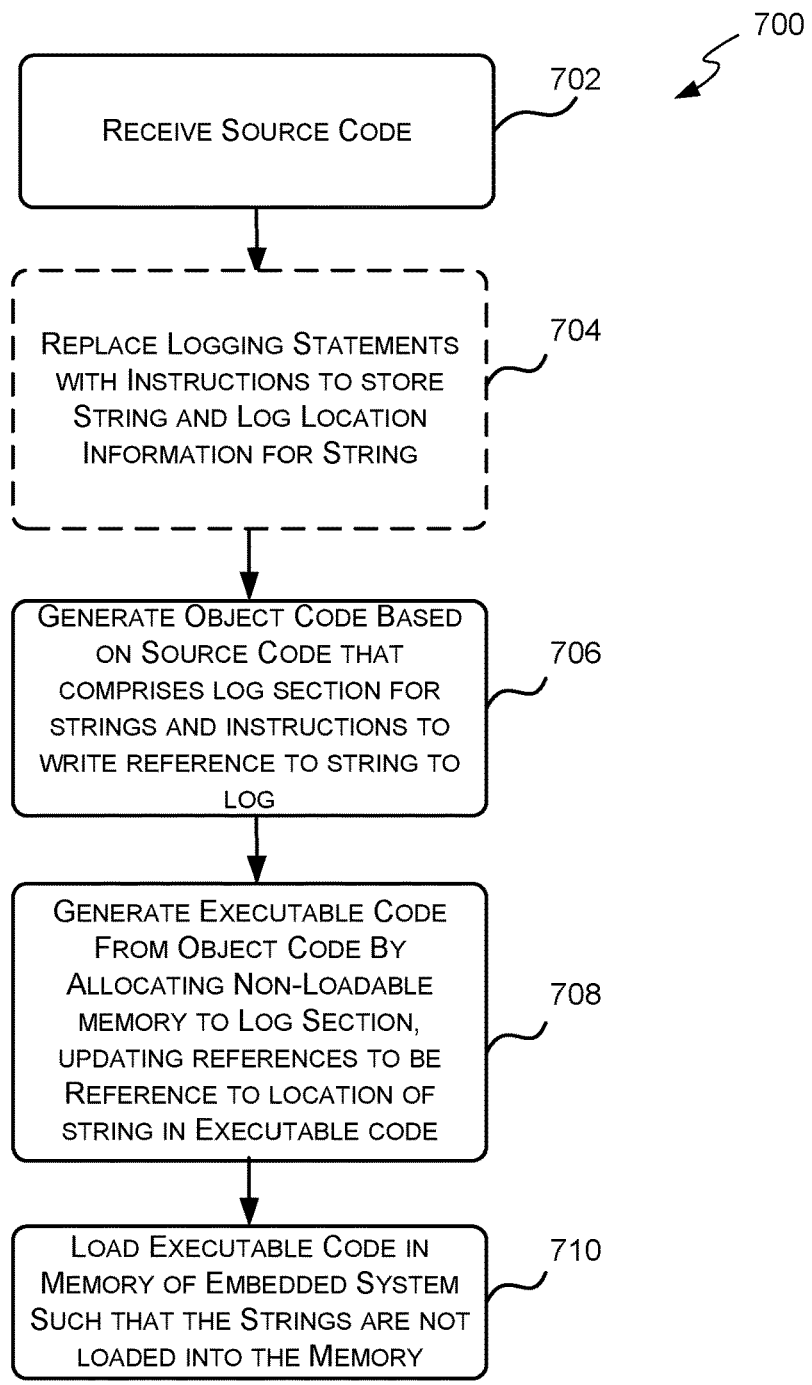
FIG. 7 is a flow diagram of an example method of generating executable code for a program that causes an embedded system to log human-readable messages or strings without storing the human-readable messages or strings in memory of the embedded system.

Reference is now made to FIG. 7 which illustrates a method 700 for generating executable code for a program that will cause the embedded system to log human-readable messages or strings during execution of the program without storing the human-readable messages or strings in the memory of the embedded system. The method 700 may be implemented by a computing-based device such as the computing-based device 900 described below with reference to FIG. 9.

The method 700 begins at block 702, where the source code 310 for a program to be run on an embedded system is received. As described above source code is a description of a program in a high-level programming language, such as, but not limited to C, which is readable by humans, but not a processor. The received source code 310 includes one or more human-readable messages or strings to be logged during execution of the program. The human-readable messages or strings may provide information to a programmer or developer on the operation and/or performance of the program which may aide the programmer or developer in debugging the program.

In some cases, the source code 310 may comprise one or more logging statements which indicate a human-readable message or string to be logged. In particular, logging statements are statements with a predefined format that identify when a human-readable message or string is to be logged and the specific human-readable message or string to be logged. As described above, example syntax for a logging statement is Log_String ("STRING EXAMPLE") which indicates the string "STRING EXAMPLE" is to be logged. Where the received source code 310 comprises one or more logging statements, the method 700 proceeds to block 704.

In other cases, instead of comprising logging statements the source code 310 may comprise instructions that (i) cause a human-readable message or string to be stored in a special section of the resultant object code; and (ii) cause a reference to the human-readable string to be logged in a memory (e.g. in a log buffer) of the embedded system. For example, to cause the string "Hello" to be logged, the source code 310 may comprise a first instruction, "static constant [in section Log] Temp1="Hello"" which creates a variable Temp1 stored in a static constant array in the Log section of the object code; and a second instruction, "LogBuffer=&Temp1", which causes the address of the Temp1 variable to be written to the LogBuffer. In these cases the method 700 may proceed directly to block 706.

At block 704, a pre-processor 302 identifies logging statements in the source code 310 and replaces each logging statement in the source code 310 with one or more source code instructions which (i) causes the identified human-readable message or string to be stored in a particular section of the resultant object code; and (ii) causes a reference to the human-readable message or string to be written to memory of the embedded system (e.g. written to a log buffer of the embedded system).

For example, as shown in FIG. 4 the pre-processor 302 may replace the logging statement "Log_String ("Hello")" with two instructions. The first instruction, "static constant [in section Log] Temp1="Hello"" creates a variable Temp1 which is to be stored in a static constant array in the Log section of the resultant object code. The second instruction, "LogBuffer=&Temp1", causes the address of the Temp1 variable to be written to the LogBuffer.

Once the logging statements in the source code 310 have been replaced to produce pre-processed source code 312 the method 700 proceeds to block 706.

At block 706, a compiler 304 generates object code 314 based on the source code 312. The generated object code 314 comprises a separate log section that includes the one or more identified human-readable messages or strings; and one or more machine instructions to cause the embedded system to log references to the human-readable strings to memory of the embedded system, each reference being identified by a symbol.

For example, as shown in FIG. 4, the compiler 304 may convert the source code instruction "LogBuffer=&Temp1" to a set of machine instructions such as:

```
load address LogBuffer into T0
load address Temp1 into T1
store T1 into T0
``` where LogBuffer is the Log Buffer, and T0 and T1 are registers of the embedded system. It will be evident to a person of the art that the first instruction loads the address of the LogBuffer into register T0, the second instruction loads the address of Temp1 (where the string "Hello" is being stored) into register T1, the third instruction stores the contents of register T1 (the address of Temp1) at the contents of register T0 (the address of the LogBuffer). Therefore these instructions cause the address associated with the string "Hello" to be stored in the Log Buffer. In this example both LogBuffer and Temp1 are symbols that are resolved to, and replaced with, addresses before the code can be executed.

Once the object code 314 has been generated the method 700 proceeds to block 708.

A block 708, a linker 306 generates executable code 318 based on the object code 314.

As is known to those of skill in the art the linker 306 associates each symbol in the object code 314 with an address and then generates executable code from the object code based on the addresses associated with the symbols. For example, as shown in FIG. 4 the linker 306 may allocate address 0x80004 to the LogBuffer symbol and generate the executable code from the object code by replacing the LogBuffer symbol with address 0x80004. As described above the portions of memory to be allocated to the different sections of the object code is defined by a linker script 320.

In the embodiments described herein the linker script 320 also causes the linker 306 to mark the log section of the object code (which includes all the human-readable messages or strings) as a non-loadable section. In some cases a linker 306 allocates addresses to symbols that relate to a non-loadable section of object code. For example, as described above the linker script 320 may cause the linker 306 to allocate addresses starting at address 0. In other cases the linker 306 does not allocate an actual address to symbols (e.g. Temp1 and Temp2) that relate to a non-loadable section, but instead allocates an address or offset into the section of the executable code itself. Accordingly, the symbols that represent the reference to human-readable message and strings may be allocated an address or offset into the log section of the executable code 318.

For example, as shown in FIG. 4, symbols Temp1 and Temp2 which represent the reference to strings "Hello" and "Goodbye" respectively have been allocated offsets 9 and 15. The symbols Temp1 and Temp2 are then replaced by their allocated offset in the executable code 318. This causes the offset to be logged or stored in the log buffer of the embedded system when the executable code is run by the processor of the embedded system.

As described above, although the log section is marked as non-loadable the log section is still included in the executable code allowing the actual human-readable messages or strings to be retrieved from the executable code via the references (e.g. addresses or offsets) stored in the memory (e.g. log buffer) of the embedded system.

Once the executable code 318 has been generated the method 700 proceeds to block 710.

At block 710 a loader 308 loads the executable code 318 into the memory of the embedded system such that the one or more identified human-readable messages are strings are not stored in the memory of the embedded system.

Figure 8:
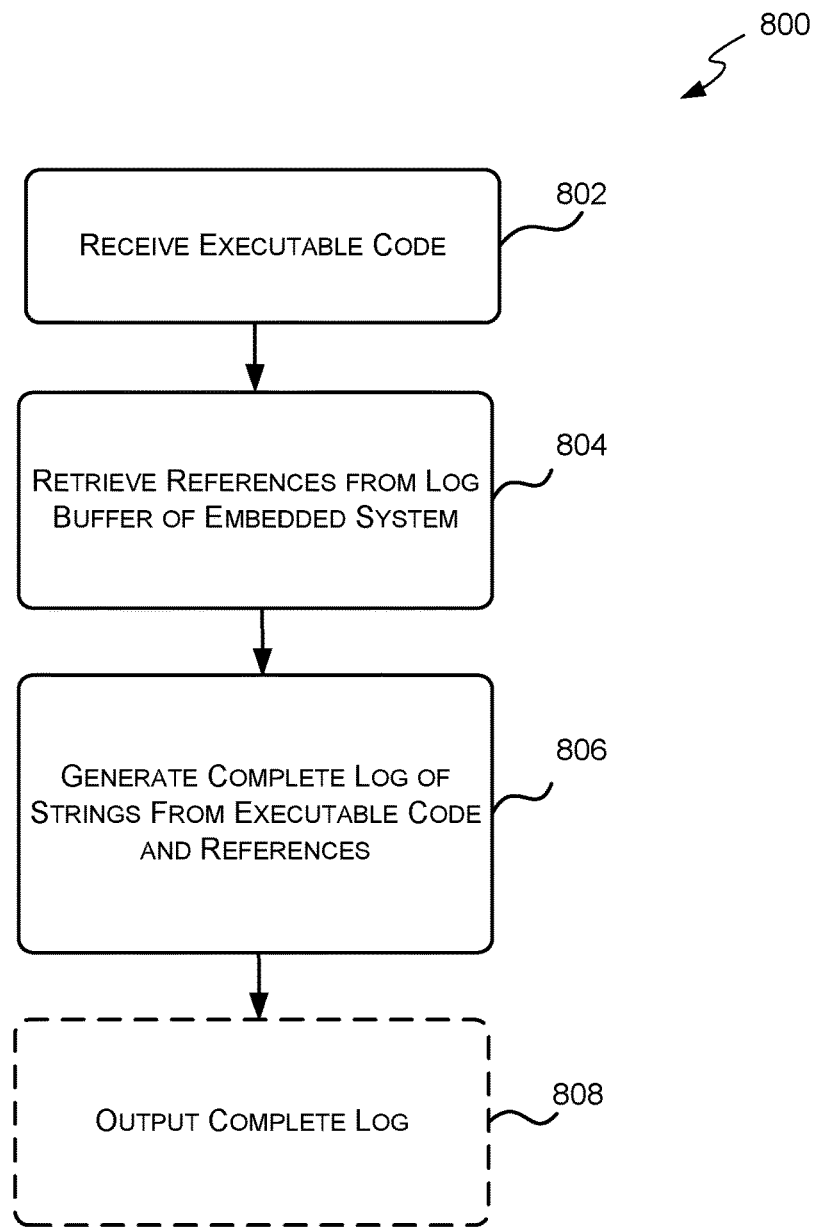
FIG. 8 is a flow diagram of an example method of generating a complete log from executable code generated according to the method of FIG. 7 and references generated when the executable code is executed by the embedded system of FIG. 5.

Reference is now made to FIG. 8 which illustrates an example method 800 for generating a complete log from the references 508 in the log buffer 506. The method 800 may be implemented by the host computing based device 512.

The method 800 begins at block 802 where the host computing-based device 512 receives executable code 318 that has a non-loadable section that includes one or more human-readable messages or strings to be logged. Each human-readable message or string is at an identifiable location (e.g. offset) in the non-loadable section. For example, as shown in FIG. 6 the executable code 318 may comprise a log section which comprises three strings—"String 1", "Hello", and "Goodbye" which are at offsets 0, 9, and 15 with respect to the start of the log section.

The host-computing based device 512 may receive the executable code 318 via any suitable manner. For example, the executable code 318 may be loaded into memory of the host computing-based device 512 via removable media, such as a USB memory stick; or over a network connection such as a wired or wireless connection. Once the host computing-based device 512 receives the executable code 318 the method 800 proceeds to block 804.

At block 804, the host computing-based device 512 obtains the references 508 in the log buffer 506 of the embedded system 500. As described above each reference 508 indicates the location of a particular human-readable message or string in the computer executable code 318. In some cases each reference 508 may be an offset from the start of the non-loadable section (e.g. log section) of the executable code 308 in which the human-readable message or strings are stored. For example, as shown in FIG. 6 the log buffer 506 may comprise two offsets 508—9 and 15 which refer to the location of the strings "Hello" and "Goodbye" in the executable code 318.

The host computing-based device 512 may obtain the references 508 in the log buffer 506 via any suitable manner. For example, the host computing-based device 512 may be coupled to, or otherwise in communication with, the embedded system such that the host computing-based device can read the references 508 from the log buffer 506 and/or the embedded system 500 can transfer the references 508 in the log buffer 506 to the host computing-based device 512. Once the host computing-based device 512 has obtained the references 508 in the log buffer 506 of the embedded system 500, the method 800 proceeds to block 806.

At block 806, the host computing-base device 512 generates a complete log 514 based on the executable code 318 and the references retrieved from the log buffer. In particular, the host computing-based device 512 uses the references 508 obtained from the log buffer 506 to identify one or more strings in the non-loadable section of the executable code 318 and then generate a complete log that includes the identified strings as indicated by the references 508 in the log buffer 506. In some cases the complete log may include the identified strings in the same order as the corresponding references 508 in the log buffer 506.

For example, as shown in FIG. 6, if the log buffer 506 includes two references 508—offset 9 and offset 15—which indicate the location of two strings in a non-loadable section (e.g. log section) of the executable code 318, the host computing-based device 512 determines the location of the non-loadable section (e.g. log section) 318 and then identifies a first string ("Hello") at offset 9 and a second string ("Goodbye") at offset 15 and generates a complete log 514 that includes the first and second identified strings in place of the references (e.g. the complete log 514 comprises "Hello", "Goodbye"). In the example of FIG. 6 the offset is the number of characters from the beginning of the log section at which the string begins. For example, the string at offset 9 is the string of characters that begins at the $10^{th}$ character in the log section and ends with the first null character thereafter; and the string at offset 15 is the string of characters in the log section that begins at the $16^{th}$ character in the log section and ends with the first null character thereafter. It will be evident to a person of skill in the art that this is an example only and other references that indicate the location of a string in the non-loadable section may be used.

In the examples described herein the complete log is generated from the executable code 318 and the references retrieved from the log buffer. However, in other examples the complete log may be generated from the references retrieved from the log buffer and another file containing the strings. For example, after the executable code 318 is generated the non-loadable section of the executable code 318 containing the strings may be extracted and saved in a separate file. The complete log can then be generated from the references retrieved from the log buffer and that separate file. This means that the host computing-based device 512 does not have to obtain the entire executable code 318 to generate the complete log. However, by using a separate file to store the strings there is a risk that the separate file will not match (or will get out of sync with) the program that is currently running on the embedded system which may result in a complete log that is confusing or misleading.

Once the complete log 514 has been generated the method 800 may continue to block 808 where the complete log 514 is output by the host computing-based device 512. The complete log 514 may be output using any suitable means. For example, the complete log 514 may be output to a display screen, to a communications interface to be transmitted via wire, or wirelessly, to another device, to a printer device, and/or to a storage medium such as memory.

Figure 9:
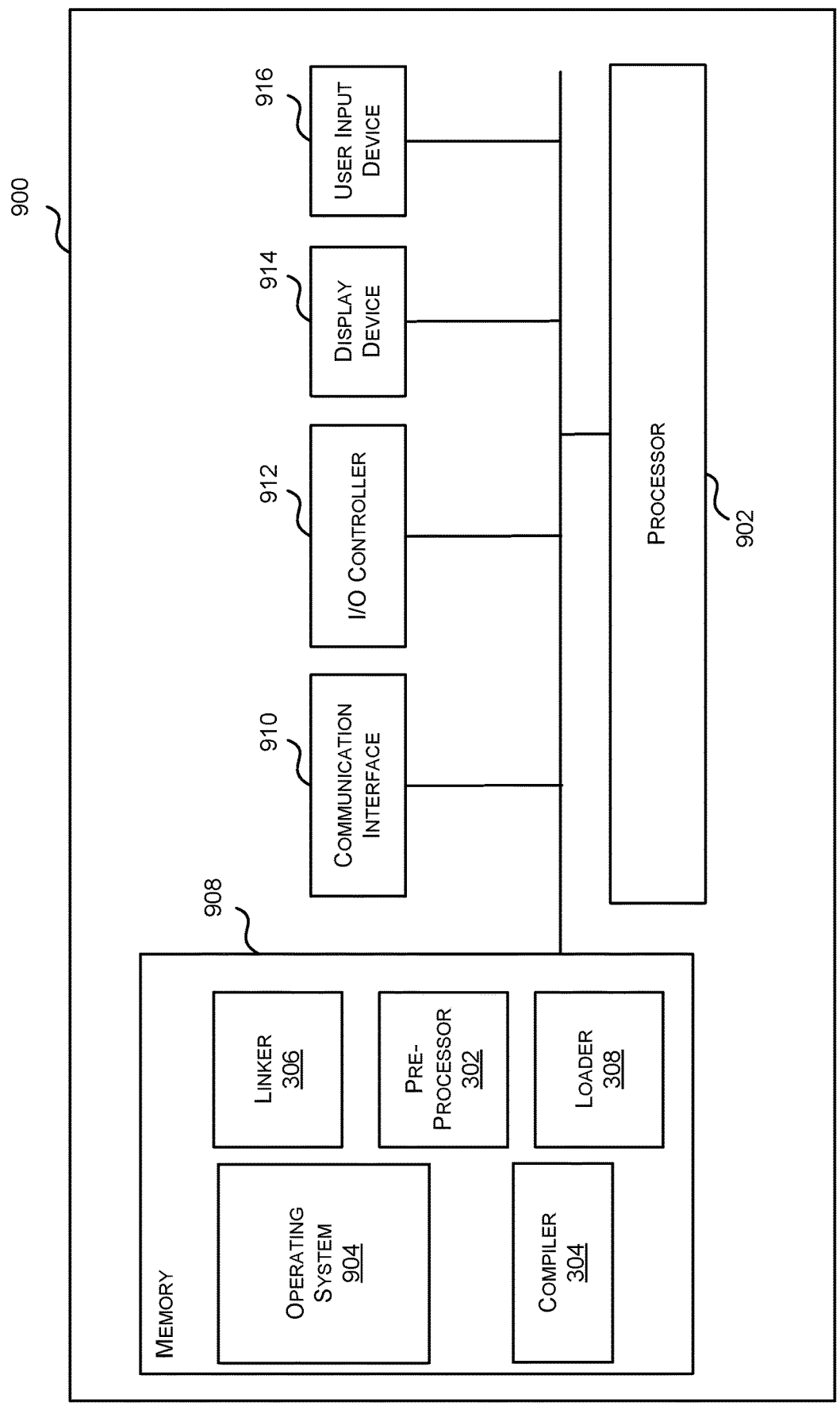
FIG. 9 is a block diagram of an example computing-based device.

FIG. 9 illustrates various components of an exemplary computing-based device 900 which may be implemented as any form of a computing and/or electronic device, and in which embodiments of the system 300 of FIG. 3 and method 700 of FIG. 7 may be implemented.

Computing-based device 900 comprises one or more processors 902 which may be microprocessors, controllers or any other suitable type of processors for processing computer executable instructions to control the operation of the device in order to generate executable code from source code. In some examples, for example where a system on a chip architecture is used, the processors 902 may include one or more fixed function blocks (also referred to as accelerators) which implement a part of the method 700 of FIG. 7 in hardware (rather than software or firmware). Platform software comprising an operating system 904 or any other suitable platform software may be provided at the computing-based device to enable application software, such as, but not limited to, a pre-processor 302, compiler 304, linker 306 and loader 308, to be executed on the device.

The computer executable instructions may be provided using any computer-readable media that is accessible by computing based device 900. Computer-readable media may include, for example, computer storage media such as memory 908 and communications media. Computer storage media (i.e. non-transitory machine readable media), such as memory 908, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 908) is shown within the computing-based device 900 it will be appreciated that the storage may be distributed or located remotely and accessed via a network or other communication link (e.g. using communication interface 910).

The computing-based device 900 also comprises an input/output controller 912 arranged to output display information to a display device 914 which may be separate from or integral to the computing-based device 900. The display information may provide a graphical user interface. The input/output controller 912 is also arranged to receive and process input from one or more devices, such as a user input device 916 (e.g. a mouse or a keyboard). This user input may be used to, for example, initiate generation of the executable code or loading of the executable code 318 to an embedded system 500. In an embodiment the display device 914 may also act as the user input device 916 if it is a touch sensitive display device. The input/output controller 912 may also output data to devices other than the display device, e.g. a locally connected printing device (not shown in FIG. 9).

The system 300 of FIG. 3 is shown as comprising a number of software/functional blocks. This is schematic only and is not intended to define a strict division between different logic elements of such entities. Each software/functional block may be provided in any suitable manner. It is to be understood that intermediate values described herein as being formed by a particular software/function block need not be physically generated by the software/functional block at any point and may merely represent logical values which conveniently describe the processing performed by the functional/software block between its input and output.

The embedded systems described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an embedded system. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an embedded system will now be described with respect to FIG. 10.

Figure 10:
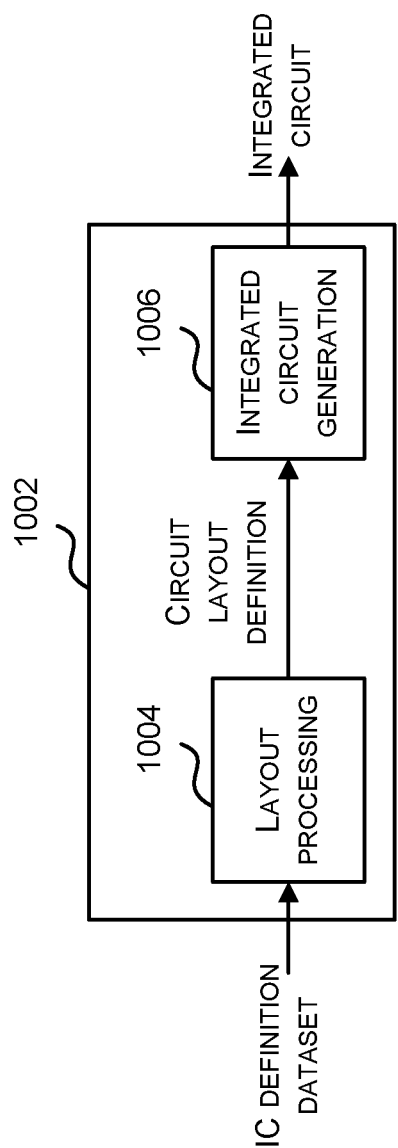
FIG. 10 is a block diagram of an example integrated circuit manufacturing system.

FIG. 10 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining an embedded system as described in any of the examples herein), process the IC definition dataset, and generate an IC according to the IC definition dataset (e.g. which embodies an embedded system as described in any of the examples herein). The processing of the IC definition dataset configures the IC manufacturing system 1002 to manufacture an integrated circuit embodying an embedded system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an embedded system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Aspects of the invention are disclosed in the following numbered clauses:

Clause 1. A computer-implemented method (700) to generate executable code for a program to be run on an embedded system which causes the embedded system to log one or more strings during execution of the executable code, the method (700) comprising: receiving source code for a program, the source code identifying one or more strings to be logged during execution of the program (702); causing a compiler to generate object code based on the source code such that the object code comprises (706): a separate log section that includes the one or more identified strings; and one or more instructions to cause the embedded system to write a reference to one of the one or more strings to memory of the embedded system, the reference represented by a symbol associated with the string; causing a linker to generate executable code based on the object code by causing the linker to mark the separate log section as a non-loadable section, and to replace each symbol associated with a string in the one or more instructions with information indicating the location of the string in the separate log section so as to form one or more executable instructions (708); and loading the executable code comprising the one or more executable instructions into the memory of the embedded system such that the one or more identified strings are not stored in the memory of the embedded system (710).

Clause 2. The method (700) of clause 1, wherein the received source code comprises one or more logging statements identifying a string to be logged, and the method (700) further comprises, prior to causing the compiler to generate the object code, causing a pre-processor to replace each logging statement in the source code with (704): one or more instructions causing the identified string to be stored in the separate log section of the object code; and one or more instructions causing a reference to the string to be stored in memory of the embedded system.

Clause 3. The method (700) of clause 2, wherein the logging statement has a predetermined format recognizable by the pre-processor.

Clause 4. The method (700) of clause 2 or clause 3, wherein the one or more instructions causing the identified string to be stored in the separate log section of the object code cause the identified string to be stored in the separate log section of the object code in a static constant array.

Clause 5. The method (700) of any preceding clause, wherein the information indicating a location of a particular string in the log section comprises an offset with respect to the log section.

Clause 6. The method (700) of any preceding clause, wherein causing the linker to mark the separate log section as a non-loadable section comprises providing the linker with a linker script that identifies the separate log section as a non-loadable section.

Clause 7. The method (700) of any preceding clause, wherein execution of the executable code by a processor of the embedded system causes the processor to write the information indicating the location of the string in the separate log section into memory of the embedded system.

Clause 8. The method (700) of clause 7, further comprising executing the executable code loaded into memory using the processor which causes the processor to write the information indicating the location of the string in the separate log section into the memory of the embedded system.

Clause 9. The method (700) of clause 8, further comprising generating a complete log of strings using a host computing-based device based on the information indicating the location of the string in the separate log section stored in the memory of the embedded system and a file comprising the separate log section of the executable code.

Clause 10. The method (700) of clause 9, where the file comprising the separate log section of the executable code is the executable code.

Clause 11. A system (300) to generate executable code for a program to be run on an embedded system which causes the embedded system to log one or more strings during execution of the executable code, the system (300) comprising: a compiler (304) configured to: receive source code (312) for a program, the source code (312) identifying one or more strings to be logged during execution of the program; and generate object code (314) based on the source code (312) such that the object code (314) comprises: a separate log section that includes the one or more identified strings; and one or more instructions to cause the embedded system to write a reference to one of the one or more strings to memory (502) of the embedded system (500), the reference represented by a symbol associated with the string; a linker (306) configured to generate executable code (318) based on the object code (314) by marking the separate log section as a non-loadable section, and replacing each symbol associated with a string in the one or more instructions with information indicating a location of the string in the separate log section so as to form one or more executable instructions; and a loader (308) configured to load the executable code (318) comprising the one or more executable instructions into the memory of the embedded system (500) such that the one or more identified strings are not stored in memory (502) of the embedded system (500).

Clause 12. The system (300) of clause 11, further comprising a pre-processor (302) configured to: receive source code (310) comprising one or more logging statements identifying a string to be logged; and generate the source code (312) received by the complier (304) based on the received source code (310) by replacing each logging statement in the received source code (310) with: one or more instructions causing the identified string to be stored in the separate log section of the object code (314); and one or more instructions causing a reference to the string to be stored in the memory (502) of the embedded system (500).

Clause 13. The system (300) of clause 12, wherein the logging statement has a predetermined format recognizable by the pre-processor (302).

Clause 14. The system (300) of clause 12 or clause 13, wherein the one or more instructions causing the identified string to be stored in the separate log section of the object code (314) causes the identified string to be stored in the separate log section of the object code (314) in a static constant array.

Clause 15. The system (300) of any of clauses 11 to 14, wherein the information indicating a location of the string in the separate log section is an offset with respect to the separate log section.

Clause 16. The system (300) of any of clauses 11 to 15, wherein the linker (306) is configured to mark the separate log section as a non-loadable section in response to receiving a linker script (320) that identifies the separate log section as a non-loadable section.

Clause 17. The system (300) of any of clauses 11 to 16, wherein execution of the executable code by a processor (503) of the embedded system (500) causes the processor (503) to write the information indicating the location of the string in the separate log section into the memory (502) of the embedded system (500).

Clause 18. The system (300) of clause 17, further comprising the embedded system (500) and execution of the executable code loaded into the memory (502) of the embedded system (500) by the processor (503) causes the processor (503) to write the information indicating the location of the string in the separate log section into the memory (502) of the embedded system (500).

Clause 19. The system (300) of clause 18, further comprising a host computing-based device (512) in communication with the embedded system (500), the host-computing-based device (512) configured to obtain the information indicating the location of the string in the separate log section stored in the memory (502) of the embedded system (500) and generate a complete log (514) of strings based on the obtained information indicating the location of the string in the separate log section stored, and a file comprising the separate log section of the executable code (318).

Clause 20. The system (300) of clause 19, wherein the file comprising the separate log section of the executable code (318) is the executable code (318).

Clause 21. The system (300) of any of clauses 11 to 20, wherein the embedded system (500) is a radio processing unit.

Clause 22. A system (300) configured to perform the method of any of clauses 1 to 10.

Clause 23. An embedded system (500) comprising a processor (503) configured to log one or more strings during execution of a program, the embedded system (500) obtained by performing the method (700) of any of claims 1 to 8 to load executable code (318) representing the program into a memory (502) of the embedded system (500) without loading the one or more strings into the memory (502) of the embedded system (500).

Clause 24. A host computing-based device (512) configured to generate a complete log of strings representing flow of a program executed by a processor of an embedded system (500), the host computing-based device (512) comprising: a processor (902); and memory (908) comprising computer executable instructions that when executed by the processor (902) cause the processor (902) to: receive a file comprising a log section (416) of executable code (318) representing the program, the log section (416) comprising one or more strings; obtain one or more references (508) stored in memory (502) of the embedded system (500), each reference (508) identifying a location of a string of the one or more strings in the log section (416) of the executable code (318), the references being stored in the memory (502) of the embedded system (500) during execution of the program; and generating a complete log that includes one or more strings of the received file identified by the references (508) in the log buffer (506).

Clause 25. The host computing-based device (512) of clause 24, wherein the received file is the executable code (318).

Clause 26. A computer-implemented method (800) of generating a complete log of strings representing flow of a program executed by a processor of an embedded system, the method (800) comprising: receiving a file comprising a log section of executable code representing the program, the log section comprising one or more strings (802); obtaining one or more references stored in memory of the embedded system, each reference identifying a location of a string of the one or more strings in the log section of the executable code, the references being stored in the memory of the embedded system during execution of the program (804); and generating a complete log that includes one or more strings of the received file identified by the references in the log buffer (806).

Clause 27. The method (800) of clause 26, wherein the received file is the executable code.

Clause 28. Computer readable code configured to perform the steps of the method (700) of any of clauses 1 to 8 when the computer readable code is run on a computer.

Clause 29. A computer readable storage medium having encoded thereon the computer readable code of clause 28.

The invention claimed is:

1. A computer-implemented method to generate executable code for a program to be run on an embedded system which causes the embedded system to log one or more strings during execution of the executable code wherein the string comprises one or more human-readable messages, the method comprising:
  receiving source code for a program, the source code identifying one or more strings to be logged during execution of the program;
  causing a compiler to generate object code based on the source code such that the object code comprises:
    a separate log section that includes the one or more identified strings; and
    one or more instructions to cause the embedded system to write a reference to one of the one or more strings to memory of the embedded system, the reference represented by a symbol associated with the string;
  causing a linker to generate executable code based on the object code by causing the linker to mark the separate log section as a non-loadable section, and to replace each symbol associated with a string in the one or more instructions with information indicating the location of the string in the separate log section so as to form one or more executable instructions; and
  loading the executable code comprising the one or more executable instructions into the memory of the embedded system such that the one or more identified strings are not stored in the memory of the embedded system.

2. The method of claim 1, wherein the received source code comprises one or more logging statements identifying a string to be logged, and the method further comprises, prior to causing the compiler to generate the object code, causing a pre-processor to replace each logging statement in the source code with:
  one or more instructions causing the identified string to be stored in the separate log section of the object code; and
  one or more instructions causing a reference to the string to be stored in memory of the embedded system.

3. The method of claim 2, wherein the logging statement has a predetermined format recognizable by the pre-processor.

4. The method of claim 2, wherein the one or more instructions causing the identified string to be stored in the separate log section of the object code cause the identified string to be stored in the separate log section of the object code in a static constant array.

5. A system to generate executable code for a program to be run on an embedded system which causes the embedded system to log one or more strings during execution of the executable code wherein the string comprises one or more human-readable messages, the system comprising:
   a compiler configured to:
      receive source code for a program, the source code identifying one or more strings to be logged during execution of the program; and
      generate object code based on the source code such that the object code comprises:
      a separate log section that includes the one or more identified strings; and
      one or more instructions to cause the embedded system to write a reference to one of the one or more strings to memory of the embedded system, the reference represented by a symbol associated with the string;
   a linker configured to generate executable code based on the object code by marking the separate log section as a non-loadable section, and replacing each symbol associated with a string in the one or more instructions with information indicating a location of the string in the separate log section so as to form one or more executable instructions; and
   a loader configured to load the executable code comprising the one or more executable instructions into the memory of the embedded system such that the one or more identified strings are not stored in the memory of the embedded system.

6. The system of claim 5, further comprising a pre-processor configured to:
   receive source code comprising one or more logging statements identifying a string to be logged; and
   generate the source code received by the complier based on the received source code by replacing each logging statement in the received source code with:
      one or more instructions causing the identified string to be stored in the separate log section of the object code; and
      one or more instructions causing a reference to the string to be stored in the memory of the embedded system.

7. The system of claim 6, wherein the logging statement has a predetermined format recognizable by the pre-processor.

8. The system of claim 6, wherein the one or more instructions causing the identified string to be stored in the separate log section of the object code causes the identified string to be stored in the separate log section of the object code in a static constant array.

9. The system of claim 5, wherein the information indicating a location of the string in the separate log section is an offset with respect to the separate log section.

10. The system of claim 5, wherein the linker is configured to mark the separate log section as a non-loadable section in response to receiving a linker script that identifies the separate log section as a non-loadable section.

11. The system of claim 5, wherein execution of the executable code by a processor of the embedded system causes the processor to write the information indicating the location of the string in the separate log section into the memory of the embedded system.

12. The system of claim 11, further comprising the embedded system and execution of the executable code loaded into the memory of the embedded system by the processor causes the processor to write the information indicating the location of the string in the separate log section into the memory of the embedded system.

13. The system of claim 12, further comprising a host computing-based device in communication with the embedded system, the host-computing-based device configured to obtain the information indicating the location of the string in the separate log section stored in the memory of the embedded system and generate a complete log of strings based on the obtained information indicating the location of the string in the separate log section stored, and a file comprising the separate log section of the executable code.

14. The system of claim 13, wherein the file comprising the separate log section of the executable code is the executable code.

15. The system of claim 5, wherein the embedded system is a radio processing unit.

16. An embedded system comprising a processor configured to log one or more strings during execution of a program, the embedded system obtained by performing the method of claim 1 to load executable code representing the program into a memory of the embedded system without loading the one or more strings into the memory of the embedded system.

17. A host computing-based device configured to generate a complete log of strings representing flow of a program executed by a processor of an embedded system, the host computing-based device comprising:
   a processor; and
   memory comprising computer executable instructions that when executed by the processor cause the processor to:
      receive a file comprising a log section of executable code representing the program, the log section comprising one or more strings wherein the or each string comprises one or more human-readable messages;
      obtain one or more references stored in memory of the embedded system, each reference identifying a location of a string of the one or more strings in the log section of the executable code, the references being stored in the memory of the embedded system during execution of the program; and
      generate a complete log that includes one or more strings of the received file identified by the references in the log buffer.

18. The host computing-based device of claim 17, wherein the received file is the executable code.

19. A non-transitory computer readable storage medium having stored thereon computer executable code configured to perform the steps of the method of claim 1 when the computer executable code is run on a computer.

* * * * *